(12) United States Patent
Aoyama et al.

(10) Patent No.: US 9,506,830 B2
(45) Date of Patent: Nov. 29, 2016

(54) PRESSURE SENSOR

(71) Applicant: FUJIKOKI CORPORATION, Tokyo (JP)

(72) Inventors: Tomohisa Aoyama, Tokyo (JP); Osamu Takatsuki, Tokyo (JP); Motohisa Mukai, Tokyo (JP); Yuichiro Sumiyoshi, Tokyo (JP)

(73) Assignee: FUJIKOKI CORPORATION (JP)

( * ) Notice: Subject to any disclaimer, the term of this patent is extended or adjusted under 35 U.S.C. 154(b) by 179 days.

(21) Appl. No.: 14/204,400

(22) Filed: Mar. 11, 2014

(65) Prior Publication Data

US 2014/0260648 A1    Sep. 18, 2014

(30) Foreign Application Priority Data

Mar. 13, 2013  (JP) ................................ 2013-050489
Jun. 21, 2013  (JP) ................................ 2013-130154

(51) Int. Cl.
  *G01L 7/00*    (2006.01)
  *G01L 19/06*   (2006.01)
  *G01L 19/00*   (2006.01)

(52) U.S. Cl.
  CPC ......... *G01L 19/069* (2013.01); *G01L 19/0046* (2013.01); *G01L 19/0084* (2013.01)

(58) Field of Classification Search
  CPC ..................................................... G01L 19/069
  USPC ............................................................. 73/725
  See application file for complete search history.

(56) References Cited

U.S. PATENT DOCUMENTS

| | | | | |
|---|---|---|---|---|
| 4,449,112 A * | 5/1984 | Gould | ................... | G01L 9/0057 338/39 |
| 4,675,643 A * | 6/1987 | Tanner | ................ | G01L 19/0084 338/3 |
| 5,595,939 A * | 1/1997 | Otake | ................. | G01L 19/0038 438/51 |
| 6,021,674 A * | 2/2000 | Roethlingshoefer | | G01L 19/0084 73/756 |
| 6,131,467 A * | 10/2000 | Miyano | ............... | G01L 19/0084 73/756 |
| 6,176,137 B1 * | 1/2001 | Sasaki | ................. | G01L 19/0038 73/754 |
| 6,186,009 B1 * | 2/2001 | Miyano | ..................... | G01L 9/06 73/756 |
| 6,457,368 B1 * | 10/2002 | Sasaki | ................. | G01L 19/0084 73/753 |

(Continued)

*Primary Examiner* — Lisa Caputo
*Assistant Examiner* — Tran M Tran
(74) *Attorney, Agent, or Firm* — Bacon & Thomas, PLLC

(57) ABSTRACT

The invention prevents a pressure receiving space of a pressure sensor from being electrically charged. In a pressure sensor, a diaphragm is attached to a base which is fixed within a cover and a pressure receiving space in which an oil is sealed is formed. A semiconductor type pressure detecting device is connected to a plurality of terminal pins by a bonding wire. A neutralization plate attached to a periphery of the semiconductor type pressure detecting device or a part of the periphery thereof is connected to an earth terminal pin by an earth bonding wire, or is connected to the earth terminal pin by a soldering so as to prevent an insulative medium sealed within the pressure receiving space from being electrically charged.

13 Claims, 7 Drawing Sheets

(56) References Cited

U.S. PATENT DOCUMENTS

| | | | | |
|---|---|---|---|---|
| 6,745,633 B2 * | 6/2004 | Sasaki | G01L 19/147 | 73/727 |
| 6,962,081 B2 * | 11/2005 | Ueyanagi | G01L 19/0084 | 73/514.18 |
| 6,978,681 B2 * | 12/2005 | Sasaki | G01L 19/142 | 73/756 |
| 7,036,385 B2 * | 5/2006 | Murai | G01L 19/0084 | 73/756 |
| 7,143,651 B2 * | 12/2006 | Sasaki | G01D 11/245 | 73/721 |
| 7,194,375 B2 * | 3/2007 | Yamakawa | G01L 19/0645 | 338/36 |
| 7,231,830 B2 * | 6/2007 | Otsuka | G01L 19/0084 | 73/756 |
| 7,412,894 B2 * | 8/2008 | Ueyanagi | G01L 19/0084 | 73/753 |
| 7,762,141 B2 * | 7/2010 | Tanaka | G01L 9/0042 | 29/852 |
| 8,028,584 B2 * | 10/2011 | Otsuka | G01L 19/0069 | 73/706 |
| 8,934,263 B2 * | 1/2015 | Eckhardt | G01L 9/00 | 361/784 |
| 2015/0177088 A1 * | 6/2015 | Takatsuki | G01L 9/0022 | 73/723 |

* cited by examiner

A-A' CROSS SECTION

B-B' CROSS SECTION

PRESSURE SENSOR

BACKGROUND OF THE INVENTION

1. Field of the Invention

The present invention relates to a pressure sensor which is provided with a semiconductor type pressure detecting device.

2. Description of the Conventional Art

This kind of pressure sensor is used for detecting a refrigerant pressure by being equipped in a freezing and refrigerating device or an air conditioning device, and detecting various fluid pressure by being equipped in an industrial device.

The semiconductor type pressure detecting device is arranged within a pressure receiving chamber which is sectioned by a diaphragm and in which an oil is sealed, and is provided with a function of converting a pressure change within a pressure receiving space into an electric signal so as to output to an external portion.

The diaphragm is a flexible metal plate, and there is a case that a problem is generated in the semiconductor type pressure detecting device if a potential difference is generated between the diaphragm and the semiconductor type pressure detecting device, or the sealed oil is charged with a static electricity.

Accordingly, the following patent document discloses a structure in which a neutralization is achieved by arranging a conductive member between the semiconductor pressure detecting device and the diaphragm and connecting the conductive member to a zero potential in an electric circuit.

PRIOR ART DOCUMENT

Patent Document

Patent Document 1: Japanese Unexamined Patent Publication No. 2003-302300

SUMMARY OF THE INVENTION

Problem to be Solved by the Invention

An object of the present invention is to provide a pressure detecting sensor which is provided with a neutralization plate having a simpler structure and is not necessary to enlarge a height of a pressure receiving space.

Means for Solving the Problem (1) A pressure sensor comprising a diaphragm which receives a pressure of a fluid, a semiconductor type pressure detecting device which is provided with a plurality of bonding pads including an earth pad, a base which forms in relation to the diaphragm a pressure receiving space in which an insulative medium such as an oil is sealed, and is provided within the pressure receiving space with the semiconductor type pressure detecting device, a plurality of terminal pins which are implanted in the base and are electrically connected to the semiconductor type pressure detecting device, and one earth terminal pin which is connected to a zero potential of an electric circuit, wherein a neutralization plate is provided on the base at a peripheral position or a part of the peripheral position of the semiconductor type pressure detecting device, the neutralization plate is arranged at a position at which a height from the base is the same as or lower than a height of the semiconductor type pressure detecting device from the base, and the neutralization plate is electrically connected to an earth pad of the semiconductor type pressure detecting device and the earth terminal pin.

(2) The pressure sensor described in the item (1), wherein the neutralization plate is electrically connected to the earth terminal pin by soldering.

(3) A pressure sensor comprising a diaphragm which receives a pressure of a fluid, a base which forms in relation to the diaphragm a pressure receiving space in which an insulative medium such as an oil is sealed, and is provided within the pressure receiving space with the semiconductor type pressure detecting device, a plurality of terminal pins which are implanted in the base and are connected to the semiconductor type pressure detecting device via a bonding wire, an earth terminal pin, and a pressure detecting portion constructed by the diaphragm and the base being integrally equipped, wherein the semiconductor type pressure detecting device, and a neutralization plate arranged at a peripheral position or a part of the peripheral position of the semiconductor type pressure detecting device are mounted on the base, the neutralization plate is arranged at a position at which a height from the base is the same as or lower than a height of the semiconductor type pressure detecting device from the base, and the neutralization plate is electrically conducted with the earth terminal pin via an earth bonding wire.

(4) The pressure sensor described in the item (3), wherein a wire diameter of the earth bonding wire is larger than wire diameters of the other bonding wires.

(5) The pressure sensor described in the item (3), wherein the earth bonding wire is constructed by a plurality of wires.

(6) The pressure sensor described in any one of the items (1) to (3), wherein the neutralization plate is formed as a quadrangular shape in its outer shell shape and has a window hole in its center portion.

(7) The pressure sensor described in any one of the items (1) to (3), wherein the neutralization plate is formed as an octagonal shape in its outer shell shape and has a window hole in its center portion.

(8) The pressure sensor described in any one of the items (1) to (3), wherein the neutralization plate is formed as a circular shape in its outer shell shape and has a window hole in its center portion.

(9) The pressure sensor described in any one of the items (1) to (3), wherein the neutralization plate is provided with a slit in its part.

Effect of the Invention

By employing the structure according to the present invention, it is possible to provide a pressure sensor which is rich in a resistance against an electromagnetic noise such as a static electricity and has a high reliability.

BRIEF EXPLANATION OF THE DRAWINGS

FIGS. 5A and 5B are explanatory views showing a first manufacturing step of the pressure sensor according to the present invention, in which FIG. 5A is a cross sectional view and FIG. 5B is a plan view;

FIGS. 6A and 6B are explanatory views showing a second manufacturing step of the pressure sensor according to the present invention, in which FIG. 6A is a cross sectional view and FIG. 6B is a plan view;

FIGS. 7A and 7B are explanatory views showing a third manufacturing step of the pressure sensor according to the present invention, in which FIG. 7A is a cross sectional view and FIG. 7B is a plan view;

DESCRIPTION OF REFERENCE NUMERALS

Figure 1:
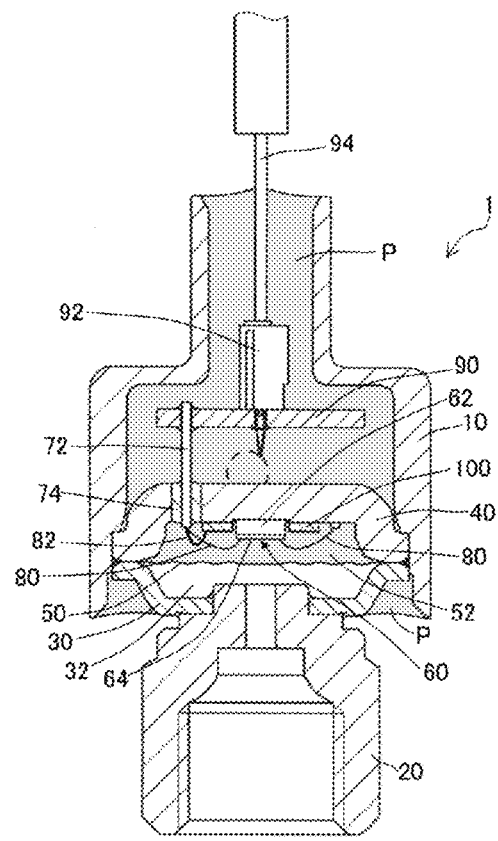
FIG. 1 is a cross sectional view of a pressure sensor according to the present invention.

1, 1001 pressure sensor
10, 1010 cover
20, 1020 fluid introduction portion
30, 1030 attaching member
32, 1032 fluid introduction chamber
40, 1040 base
50, 1050 diaphragm
52, 1052 pressure receiving space
60, 1060 semiconductor type pressure detecting device
62, 1062 glass pedestal
64, 1064 detecting element
70, 1070 terminal pin
72, 1072 earth terminal pin
74, 1074 hermetic seal
80, 1080, 1081 bonding wire
82, 1082 earth bonding wire
90, 1090 relay base plate
92, 1092 connector
94, 1094 lead wire
100, 200, 300, 400, 1100, 1200 neutralization plate
102, 202, 302, 402 window hole
404 slit
1110, 1210 soldering

DETAILED DESCRIPTION OF PREFERRED EMBODIMENTS

A description will be given of a first embodiment according to the present invention with reference to FIGS. 1 to 7.

Figure 2:
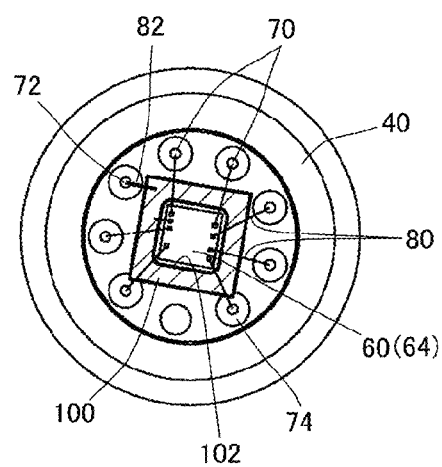
FIG. 2 is a plan view of a substantial part of the pressure sensor according to the present invention.

As shown in FIGS. 1 and 2, a pressure sensor 1 has a stepped cylindrical cover 10, and a fluid inflow pipe 20 is attached so as to face to a large-diameter opening portion of the cover 10. A base 40 is assembled in an inner portion of the cover 10, and an outer peripheral portion of a diaphragm 50 is pinched between the base portion 40 and an attaching member 30 which supports the fluid inflow pipe 20.

An insulative liquid medium such as an oil is filled in a pressure receiving space 52 which is sectioned by the dish-like base 40 and the diaphragm 50.

A semiconductor type pressure detecting device 60 is mounted to a center portion in the pressure receiving space 52 side of the base 40. The pressure detecting device 60 is constructed by a pedestal 62 which is made of a glass and a pressure detecting element (a semiconductor chip) 64 which is attached to the pedestal.

A plurality of terminal pins 70 passing through the base 40 are positioned around the semiconductor type pressure detecting device 60. The terminal pin 70 is insulated and sealed in relation to the base 40 by a hermetic seal 74 so as to rise.

An earth terminal pin 72 having the same structure as the terminal pin 70 is also provided. The terminal pin 70 and the earth terminal pin 72 are connected to a relay base plate 90, and is connected to a lead wire 94 via a connector 92 so as to be output to an external portion. The semiconductor type pressure detecting device 60 and the terminal pin 70 are connected (wired) therebetween by a bonding wire 80.

The fluid introduced into the fluid inflow pipe 20 enters into a fluid introduction chamber 32, the diaphragm 50 is deformed by a pressure of the fluid, and the medium within the pressure receiving space 52 is pressurized.

The semiconductor type pressure detecting element 64 detects a pressure fluctuation so as to convert into an electric signal, and outputs the electric signal to an external portion via the terminal pin 70.

In the pressure sensor 1 according to the present invention, a neutralization plate 100 is attached on to the base 40 so as to surround the semiconductor type pressure detecting device 60.

The neutralization plate 100 shown in FIG. 2 has a quadrangular plane shape in its outer shape, and is provided in an inner side with a window hole 102 which accommodates the semiconductor type pressure detecting device 60.

Further, the neutralization plate 100 and the earth terminal pin 72 are connected therebetween by an earth bonding wire 82.

The earth terminal pin 72 is connected to an electric circuit having a zero potential, and an electric potential charged around the semiconductor type pressure detecting device 60 is neutralized via the neutralization plate 100, whereby it is possible to prevent a malfunction of the semiconductor type pressure detecting device 60 caused by the static electricity charge.

In the present embodiment, a higher neutralization performance is provided by using the earth bonding wire 82 having a larger wire diameter than a diameter of the other bonding wires 80.

Figure 3:
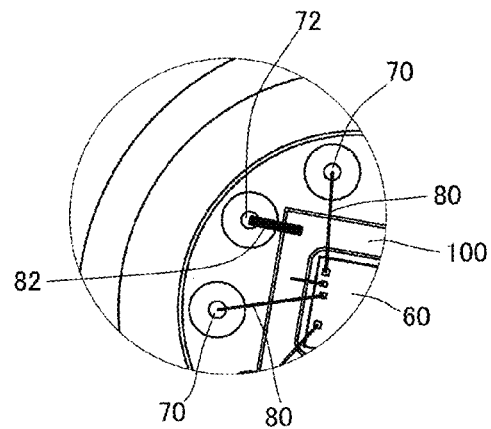
FIG. 3 is an enlarged plan view of a substantial part of the pressure sensor according to the present invention.
Figure 4:
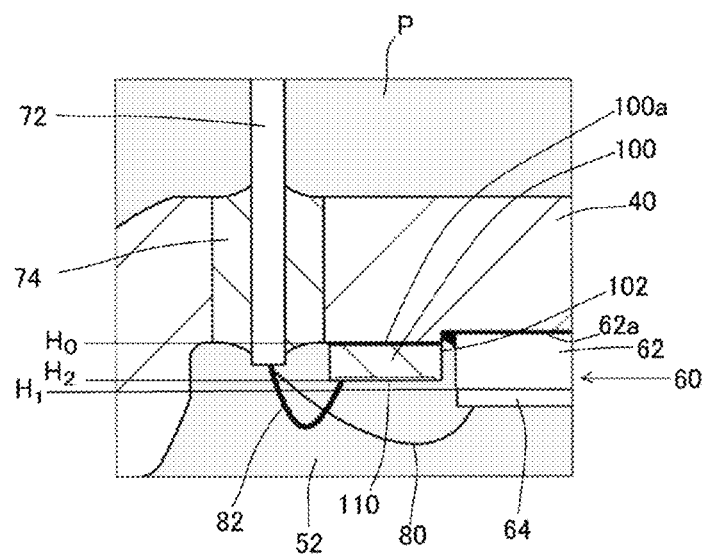
FIG. 4 is an enlarged cross sectional view of a substantial part and shows details of a semiconductor type pressure detecting element and a neutralization plate.

As shown in FIGS. 3 and 4 in an enlarged manner, the semiconductor type pressure detecting device 60 has such a structure that the pressure detecting element 64 is mounted to an upper surface of the glass pedestal portion 62, and is firmly fixed to the metal base 40 by an adhesive bonding agent layer 62a.

The neutralization plate 100 is provided with an insulation layer which is rich in a heat resistance, for example, made of an inorganic material such as ceramics and the glass, or a polyamide, a polyimide or a polyethylene terephthalate (PET), has a structure in which a conductive layer 110 is formed in one surface thereof, and is firmly fixed onto the base 40 via an adhesive bonding agent layer 100a. As a material of the conductive layer 110, a gold, a silver, a copper, an aluminum and a nickel are typical, however, a high melting point material such as a tungsten or a molybdenum can be used for obtaining a high voltage durability.

The semiconductor type pressure detecting device 60 (the pressure detecting element 64) and the terminal pin 70 are connected therebetween by the bonding wire 80, and the conductive layer 110 of the neutralization plate 100 and the earth terminal pin 72 are connected therebetween by the earth bonding wire 82 having the larger diameter.

The plate-like neutralization plate 100 equipped in the pressure sensor 1 according to the present invention is structured such that a surface height position $H_2$ of the neutralization plate 100 is lower than a surface height position $H_1$ of the glass pedestal portion 62 of the semiconductor type pressure detecting device 60, in relation to a reference height position $H_0$ of the surface of the firmly attached base 40.

As a result, the neutralization plate 100 can be arranged while keeping the height of the pressure receiving space 52 the same height as the conventional pressure sensor, and it is possible to effectively achieve the neutralization of the sealed medium such as the oil without necessity of changing the size of the pressure sensor.

The present invention can more securely prevent the malfunction of the semiconductor type pressure detecting device 60 by effectively removing the electric charge within the pressure receiving space 52, as mentioned above.

Next, a description will be given of a manufacturing process of the pressure sensor according to the present invention.

Figure 5A:
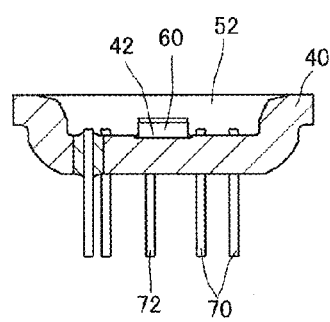
Figure 5B:
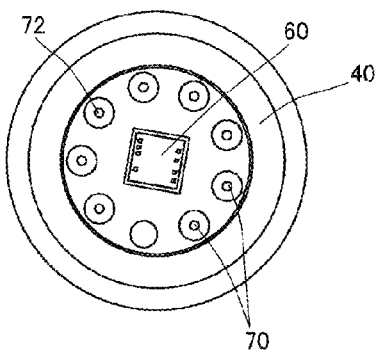

FIG. 5 shows a step of installing the base 40 which is implanted to the terminal pin 70 and the earth terminal pin 72 in a state of directing the pressure receiving space 52 side upward, and firmly fixing the semiconductor type pressure detecting device 60 to the center portion of the base 40.

For positioning the semiconductor type pressure detecting device 60, a concave portion 42 is provided in the center portion of the base 40 in this embodiment. The semiconductor type pressure detecting device 60 is firmly fixed to the base 40 by an adhesive bonding agent layer.

Figure 6A:
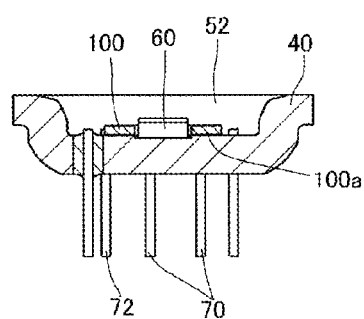
Figure 6B:
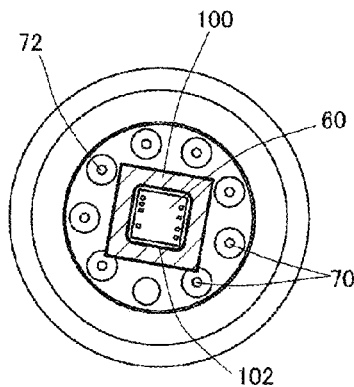

FIG. 6 shows a step of firmly fixing the neutralization plate 100 to the periphery of the semiconductor type pressure detecting device 60.

The neutralization plate 100 has the window hole 102 in the center portion, and the neutralization plate 100 is firmly fixed onto the base 40 by the adhesive bonding agent layer 100a in a state in which a conductive layer is directed upward under such a posture that the semiconductor type pressure detecting device 60 is accommodated within the window hole 102.

As shown in FIG. 4, the height position $H_2$ in the pressure receiving space 52 side of the neutralization plate 100 is structured such as to be lower than the height position $H_1$ of the glass pedestal portion 62.

Figure 7A:
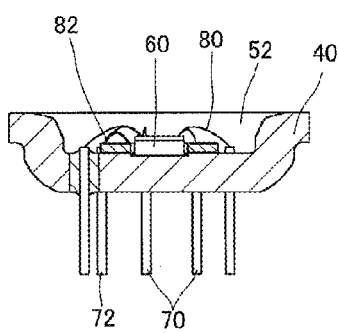
Figure 7B:
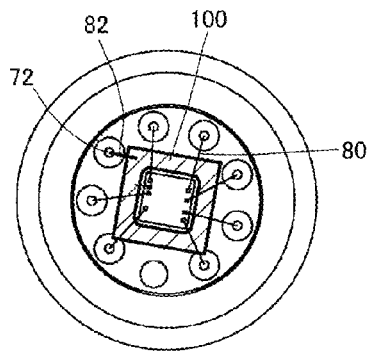

FIG. 7 shows a step of connecting between the semiconductor type pressure detecting device 60 and the terminal pin 70, and between the neutralization plate 100 and the earth terminal pin 72, by the bonding wire 80 and the earth bonding wire 82.

Since any member does not exist in an upper space of the pressure detecting element 64 and the neutralization plate 100, the connecting work can be easily executed by the same step as the normal wire bonding.

Figure 8:
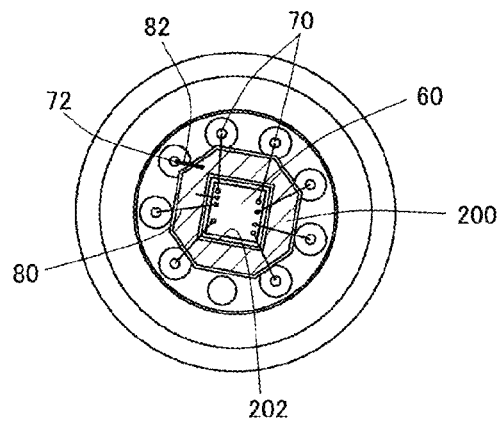
FIG. 8 is a plan view showing a second embodiment of the pressure sensor according to the present invention.

FIG. 8 shows a second embodiment of the neutralization plate. A neutralization plate 200 according to the embodiment is formed as an octagonal shape in its outer shape and has a window hole 202 in a center portion.

Figure 9:
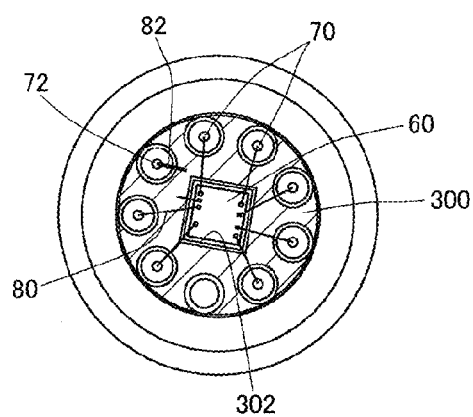
FIG. 9 is a plan view showing a third embodiment of the pressure sensor according to the present invention.

FIG. 9 shows a third embodiment of the neutralization plate. A neutralization plate 300 according to the embodiment is formed as a circular shape in its outer shape and has a window hole 302 in a center portion.

Figure 10:
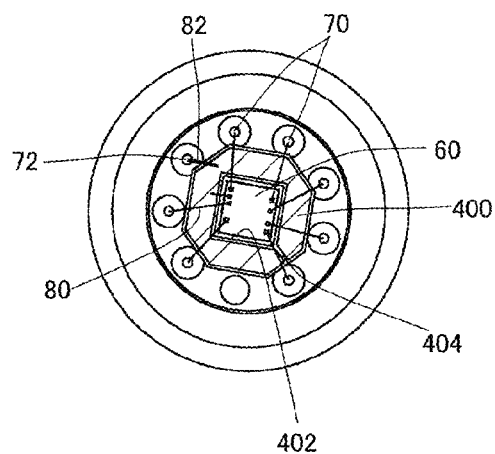
FIG. 10 is a plan view showing a fourth embodiment of the pressure sensor according to the present invention.

FIG. 10 shows a fourth embodiment of the neutralization plate. A neutralization plate 400 according to the embodiment has a window hole 402 in a center portion, and is provided with a slit 404 in its part. A position of the slit 404 is set to a diagonal position of the earth terminal pin 72.

The secure neutralizing action can be obtained by the provision of the slit 404.

Figure 11:
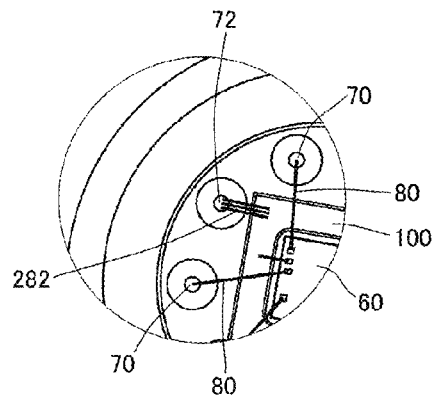
FIG. 11 is an enlarged plan view of a substantial part and shows a fifth embodiment of the pressure sensor according to the present invention.

FIG. 11 shows a fifth embodiment according to the present invention.

In the present embodiment, the earth bonding wire is constructed by a plurality of (three in this embodiment) bonding wires 282.

Each of the bonding wires employ the same wire as the other connecting bonding wire 80, and it is not necessary to prepare any special wire for grounding.

The neutralizing action can be more securely achieved by this structure. The other structures are the same as those of the previous embodiments.

The neutralization plate according to the first to fifth embodiments is set to the position at which the height from the base is lower than the height of the semiconductor type pressure detecting device from the base, however, the position can be set to the same height. The neutralization plate according to the first to fifth embodiment is provided so as surround the semiconductor type pressure detecting device, however, may be constructed as a rectangular or circular neutralization plate so as to be provided beside or in a part (a side surface) of the periphery of the semiconductor type pressure detecting device.

In the pressure sensor according to the present invention, since the neutralization plate is provided around the semiconductor type pressure detecting device or at the sideward position thereof, it is possible to prevent the influence by the electromagnetic noise such as the static electricity within the pressure receiving space, and it is possible to improve the reliability as the sensor.

Further, the neutralization plate 102 can be appropriately selected whether or not it is installed within the pressure receiving space, in correspondence to a noise level of a used environment.

Further, the manufacturing step of the pressure sensor can be simplified without deteriorating a workability of the wire bonding by making the height position of the neutralization plate lower than the height position of the semiconductor type pressure detecting device, and it is possible to keep the size the same as the conventional one.

Figure 12:
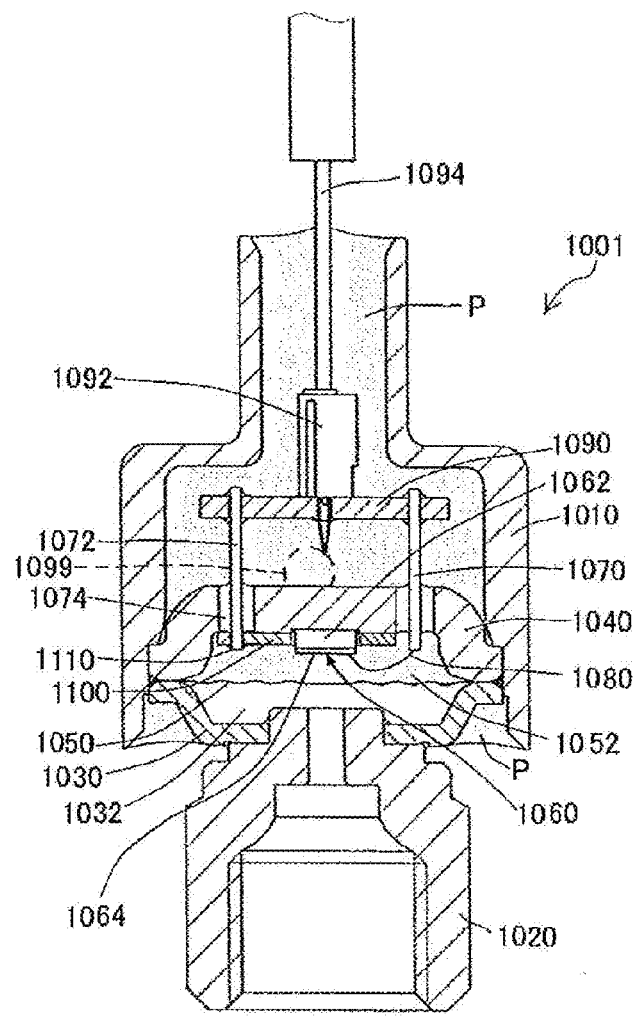
FIG. 12 is a vertical cross sectional view showing a sixth embodiment of the pressure sensor according to the present invention.
Figure 13A:
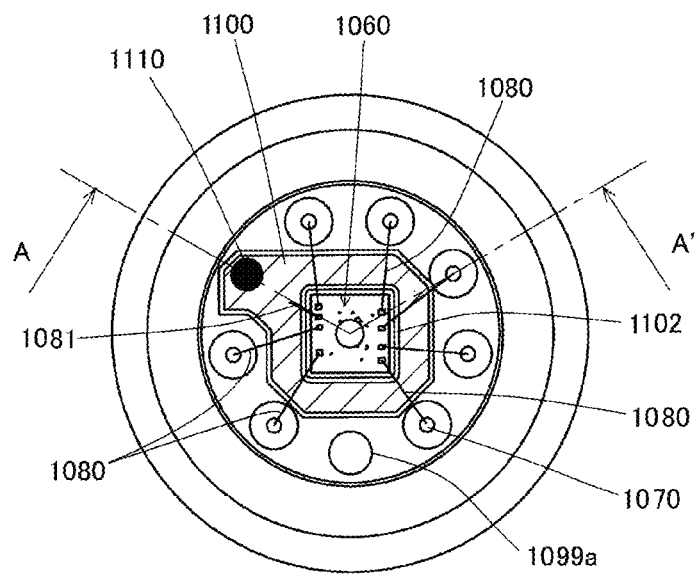
FIG. 13A is a plan view of a substantial part and shows the sixth embodiment of the pressure sensor according to the present invention.
Figure 13B:
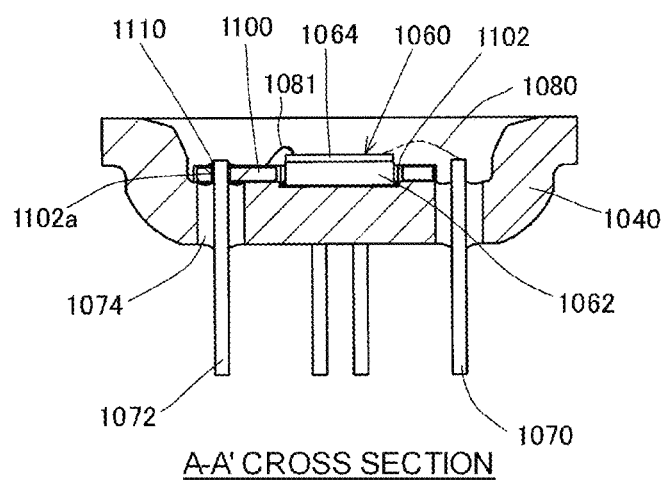
FIG. 13B is a cross sectional view along a line A-A' in FIG. 13A.

FIGS. 12 and 13 show a sixth embodiment according to the present invention.

As shown in FIGS. 12 and 13, a pressure sensor 1001 has a stepped cylindrical cover 1010, and a pressure detecting unit is attached to a large-diameter opening portion of the cover 1010, the pressure detecting unit being constructed by a base 1040 to which a semiconductor type pressure detecting device 1060 mentioned later is mounted, an attaching member 1030 supporting a connection nut 1020 to which a fluid inflow pipe (not shown) is connected, and a diaphragm 1050 which is pinched its outer peripheral portion by the base 1040 and the attaching member 1030.

An insulative liquid medium such as an oil is filled in a pressure receiving space 1052 which is sectioned by the dish-like base 1040 and the diaphragm 1050. A ball 1099 is provided for sealing a hole 1099a formed in the base 104 after filling the liquid medium into the pressure receiving space 1052 via the hole 1099, and is firmly attached to the base 1040 by welding means.

The semiconductor type pressure detecting device 1060 is mounted to a center portion in the pressure receiving space 1052 of the base 1040. The pressure detecting device 1060 is constructed by a glass pedestal 1062 and a pressure detecting element (a semiconductor chip) 1064 which is attached to the pedestal. The pressure detecting element 1064 is provided with eight bonding pads (electrodes) in this embodiment, three of them are a power source input pad for an output signal, an earth pad and a signal output pad, and the remaining five are signal adjusting pads.

A plurality of (eight in the embodiment) terminal pins 1070 and 1072 passing through the base 1040 are positioned around the semiconductor type pressure detecting device 1060. The terminal pins 1070 and 1072 are insulated and sealed by a hermetic seal 1074 in relation to the base 1040 so as to rise.

One of a plurality of terminal pins is the earth terminal pin 1072. Seven terminal pins 1070 and one earth terminal pin 1072 are connected to a relay base plate 1090. Further, three terminal pins 1070 and 1072 which are connected to the power supply input pad, the earth pad and the signal output pad are connected to a lead wire 1094 via a connector 1092. The lead wire 1094 is connected to an electric circuit (not shown) provided in a control panel such as a freezing and refrigerating device or an air conditioning device in which the pressure sensor 1001 is installed.

Each of the bonding pads except the earth pad and the terminal pin 1070 in the semiconductor type pressure detecting device 1060 (the pressure detecting device 1064) are connected (wired) by a bonding wire 1080. Further, the earth pad is connected to a neutralization plate 1100 mentioned later by a bonding wire 1081.

After the pressure detecting unit mentioned above is arranged within the cover 1010, a resin P is filled into the inner portion of the cover 1010 from a large-diameter opening portion side and a small-diameter opening portion side (a side from which a lead wire 1094 is derived) of the cover 1010 so as to be solidified, whereby the pressure detecting unit is fixed within the cover 1010.

The fluid introduced into the connection nut 1020 enters into a fluid introduction chamber 1032, and the diaphragm 1050 is deformed by the pressure, and pressurizes the medium within the pressure receiving space 1052.

The semiconductor type pressure detecting device 1064 detects the pressure fluctuation so as to convert into an electric signal, and outputs the electric signal to an external portion via a terminal pin 1070.

In the sixth embodiment, the neutralization plate 1100 is attached onto the base 1040 by an adhesive bonding agent so as to surround the semiconductor type pressure detecting device 1060 (around the semiconductor type pressure detecting device 1060).

The neutralization plate 110 has a polygonal plane shape in its outer shape, and is provided in its inner side with a window hole 1102 for surrounding an outer periphery of the semiconductor type pressure detecting device 1060, and a hole portion 1102a for inserting the earth terminal pin 1072.

In a state in which the neutralization plate 1100 is attached onto the base 1040, a leading end portion of the earth terminal pin 1072 inserted to the hole portion 1102 slightly protrudes out of an upper surface of the neutralization plate 1100. Further, the neutralization plate 1100 and the earth terminal pin 1072 are electrically connected therebetween by a soldering 1110.

Since the neutralization plate 1100 and the earth terminal pin 1072 are connected by the soldering 1110, it is possible to connect with a flat surface.

The earth terminal pin 1072 is connected to the zero potential of the electric circuit provided in the control panel of the freezing and refrigerating device or the air conditioning device in which the pressure sensor 1001 is installed, via the lead wire 1094, and the electric potential charged around the semiconductor type pressure detecting device 1060 or the electric potential charged in the liquid medium filled in the pressure receiving space 1052 are neutralized via the neutralization plate 1100, whereby it is possible to prevent the malfunction caused by the electric charge of the semiconductor type pressure detecting device 1060.

Figure 14A:
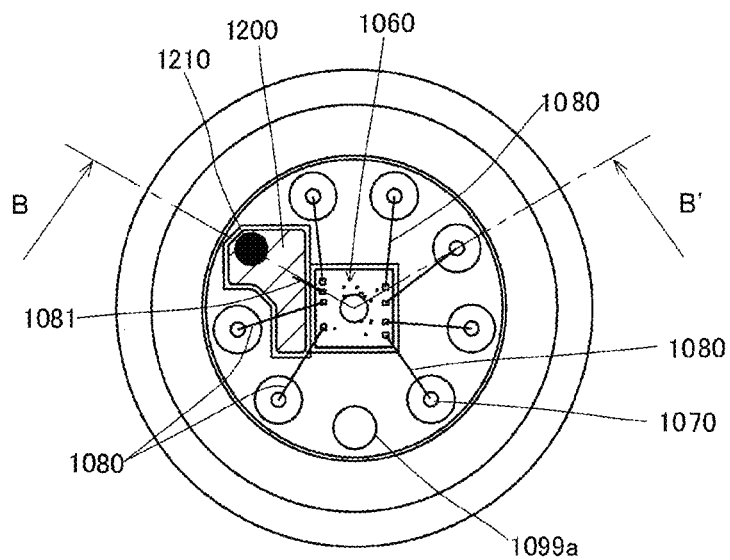
FIG. 14A is a plan view of a substantial part and shows a seventh embodiment of the pressure sensor according to the present invention.
Figure 14B:
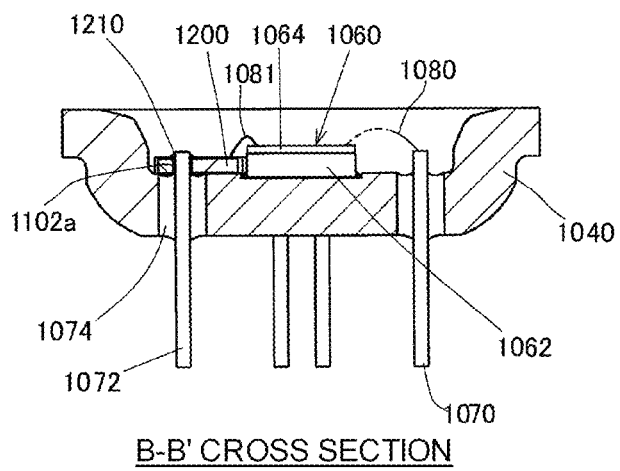
FIG. 14B is a cross sectional view along a line B-B' in FIG. 14A.

FIG. 14 is a view showing a substantial part of a seventh embodiment of the pressure sensor according to the present invention, and the same reference numerals as those of FIGS. 12 and 13 denote the same or equivalent portions.

In the seventh embodiment shown in FIG. 14, a neutralization plate 1200 is attached onto the base 1040 by an adhesive bonding agent in a part (a side surface) around the semiconductor type pressure detecting device 1060.

The neutralization plate 1200 has a planar shape in its outer shape, is arranged in a side surface of the detecting device 1060 differently from the shape surrounding the semiconductor type pressure detecting device 1060 shown in FIG. 14, and is formed compact in comparison with the neutralization plate 1100 mentioned above.

The neutralization plate 1200 is also connected to the earth pad of the semiconductor type pressure detecting device 1060 by the bonding wire 1081, and the neutralization plate 1200 and the earth terminal pin 1072 inserted to the hole portion 1102a provided in the neutralization plate 1200 are electrically connected therebetween by a soldering 1210.

Since the neutralization plate 1200 and the earth terminal pin 1072 are connected by the soldering 1210, it is possible to connect with a flat surface.

The earth terminal pin 1072 is connected to the zero potential of the electric circuit provided in the control panel of the freezing and refrigerating device or the air conditioning device in which the pressure sensor 1001 is installed, via the lead wire 1094, and the electric potential charged around the semiconductor type pressure detecting device 1060 or the electric potential charged in the liquid medium filled in the pressure receiving space 1052 are neutralized via the neutralization plate 1200, whereby it is possible to prevent the malfunction caused by the electric charge of the semiconductor type pressure detecting device 1060.

The neutralization plate 1100 or 1200 is provided with an insulation layer which is rich in a heat resistance, for example, made of an inorganic material such as ceramics and the glass, or a polyamide, a polyimide or a polyethylene terephthalate (PET), has a structure in which a conductive layer is formed in one surface thereof, and is firmly fixed onto the base 1040 via an adhesive bonding agent layer. The conductive layer may be constructed by a metal plate or formed by printing or calcination. As a material of the conductive layer, a gold, a silver, a copper, an aluminum and a nickel are typical, however, a high melting point material such as a tungsten or a molybdenum can be used for obtaining a high voltage durability.

Further, the neutralization plate may be constructed only by the metal plate without provision of the insulating layer.

The neutralization plates according to the sixth and seventh embodiments are formed as the polygonal shapes, however, can be formed as the rectangular shape such as the quadrangular shape or the octagonal shape or the circular shape in the same manner as the first to third embodiments. Further, the neutralization plates according to the sixth and seventh embodiments are not provided with any slit, however, may be provided with a slit in the same manner as the fourth embodiment.

The plate-like neutralization plates 1100 and 1200 equipped in the sixth and seventh embodiments according to the present invention are structured such that the height thereof from the base 1040 is set to be identical to or lower than the height of the semiconductor type pressure detecting device 1060 from the base 1040. In other words, the neutralization plates 1100 and 1200 are structured such that the surface height position of the neutralization plate is lower than the surface height position of the glass pedestal portion 1062 of the semiconductor type pressure detecting device 1060 in relation to the reference height position of the surface of the firmly fixed base 1040.

As a result, the neutralization plates 1100 and 1200 can be arranged while keeping the height of the pressure receiving space 1052 the same as the conventional pressure sensor, and it is possible to effectively achieve the neutralization of the sealed medium such as the oil without necessity of changing the size of the pressure sensor.

Further, on the basis of the structure mentioned above, the neutralization plates 1100 and 1200 do not obstruct at the time of wire bonding the bonding pad of the pressure detecting element 1064 and the terminal pin 1070, and the workability is not lowered.

The present invention can effectively remove the electric charge within the pressure receiving space 1052 so as to more securely prevent the malfunction of the semiconductor type pressure detecting device 1060 as mentioned above.

The height positions of the neutralization plates 1100 and 1200 may be made lower than the height position of the glass pedestal 1062.

Further, the neutralization plates 1100 and 1200 and the earth terminal pin 1072 are electrically connected therebetween by the soldering 1110, however, the present invention is not limited particularly to this, but they can be electrically connected by a caulking method, a crimping method, a press fitting method, a welding method or an adhesive bonding method using a conductive adhesive bonding agent.

What is claimed is:

1. A pressure sensor comprising:
    a diaphragm which receives a pressure of a fluid;
    a semiconductor type pressure detecting device which is provided with a plurality of bonding pads including an earth pad;
    a base which forms in relation to said diaphragm a pressure receiving space in which an insulative medium is sealed, and is provided within said pressure receiving space with said semiconductor type pressure detecting device; and
    a plurality of terminal pins which are implanted in said base and are electrically connected to said semiconductor type pressure detecting device, and one earth terminal pin which is connected to a zero potential of an electric circuit,
    wherein a neutralization plate is provided on said base at a peripheral position or a part of the peripheral position of said semiconductor type pressure detecting device,
    wherein said neutralization plate is arranged at a position at which a height from said base is the same as or lower than a height of said semiconductor type pressure detecting device from said base, and
    wherein said neutralization plate is electrically connected to said earth pad of said semiconductor type pressure detecting device and said earth terminal pin.

2. The pressure sensor according to claim 1, wherein said neutralization plate is electrically connected to said earth terminal pin by soldering.

3. A pressure sensor comprising:
    a diaphragm which receives a pressure of a fluid;
    a base which forms in relation to said diaphragm a pressure receiving space in which an insulative medium is sealed, and is provided within said pressure receiving space with a semiconductor type pressure detecting device;
    a plurality of terminal pins which are implanted in said base and are connected to said semiconductor type pressure detecting device via a bonding wire, and an earth terminal pin; and
    a pressure detecting portion constructed by said diaphragm and said base being integrally equipped with said semiconductor type pressure detecting device,
    wherein said semiconductor type pressure detecting device, and a neutralization plate arranged at a peripheral position or a part of the peripheral position of said semiconductor type pressure detecting device are mounted on said base,
    wherein said neutralization plate is arranged at a position at which a height from said base is the same as or lower than a height of said semiconductor type pressure detecting device from said base, and
    wherein said neutralization plate is electrically conducted with said earth terminal pin via an earth bonding wire.

4. The pressure sensor according to claim 3, wherein a wire diameter of said earth bonding wire is larger than wire diameters of the other bonding wires.

5. The pressure sensor according to claim 3, wherein said earth bonding wire is constructed by a plurality of wires.

6. The pressure sensor according to claim 1, wherein said neutralization plate is formed as a quadrangular shape in its outer shell shape and has a window hole in its center portion.

7. The pressure sensor according to claim 1, wherein said neutralization plate is formed as an octagonal shape in its outer shell shape and has a window hole in its center portion.

8. The pressure sensor according to claim 1, wherein said neutralization plate is formed as a circular shape in its outer shell shape and has a window hole in its center portion.

9. The pressure sensor according to claim 1, wherein said neutralization plate is provided with a slit in its part.

10. The pressure sensor according to claim 3, wherein said neutralization plate is formed as a quadrangular shape in its outer shell shape and has a window hole in its center portion.

11. The pressure sensor according to claim 3, wherein said neutralization plate is formed as an octagonal shape in its outer shell shape and has a window hole in its center portion.

12. The pressure sensor according to claim 3, wherein said neutralization plate is formed as a circular shape in its outer shell shape and has a window hole in its center portion.

13. The pressure sensor according to claim 3, wherein said neutralization plate is provided with a slit in its part.

\* \* \* \* \*